United States Patent [19]
Smith, III

[11] Patent Number: 5,700,036
[45] Date of Patent: Dec. 23, 1997

[54] IDENTIFICATION PROTECTIVE COVER

[76] Inventor: Steele C. Smith, III, 17712 Lewis La., Huntington Beach, Calif. 02647

[21] Appl. No.: 606,962

[22] Filed: Feb. 26, 1996

[51] Int. Cl.⁶ .................... B42D 15/10; G11B 3/00
[52] U.S. Cl. .................... 283/72; 283/94; 283/116; 283/901
[58] Field of Search .................... 283/72, 76, 79, 283/80, 102, 107–111, 900–904, 116, 94; 150/147; 229/87.06; 383/106; D9/306; D19/75; D6/626; D3/247, 227, 303; 40/1.5, 731, 771, 776

[56] References Cited

U.S. PATENT DOCUMENTS

| | | | |
|---|---|---|---|
| D. 134,884 | 1/1943 | Engelstein | D3/247 |
| 513,749 | 1/1894 | Atheron | 150/147 |
| 866,172 | 9/1907 | Westphall | 383/106 |
| 1,814,967 | 7/1931 | Royal | 383/106 |
| 2,725,913 | 12/1955 | Horwin | 150/147 |
| 3,446,260 | 5/1969 | Osher | 150/147 |
| 3,829,995 | 8/1974 | Fakoury | 150/147 |
| 3,958,690 | 5/1976 | Gee, Sr. | 150/147 |
| 4,514,919 | 5/1985 | Plutsky | 40/159 |
| 4,988,556 | 1/1991 | Nilsen et al. | 428/195 |
| 5,090,736 | 2/1992 | Minkus | 283/108 |
| 5,323,552 | 6/1994 | Fritz | 40/731 |
| 5,364,671 | 11/1994 | Gustafson | 428/14 |
| 5,445,417 | 8/1995 | Bromer et al. | 283/111 |

*Primary Examiner*—Daniel W. Howell
*Assistant Examiner*—Gregory Andoll
*Attorney, Agent, or Firm*—Maria Erlinda C. Sarno

[57] ABSTRACT

A protective cover comprising of a flexible polymeric sheet bonded continuously along three sides to form a pocket for slidably inserting an insert therethrough. An opaque coating, preferably black in color, is applied at specific desired location on the surface of either the front, rear, or on both of the sheets comprising the protective cover. The opaque coating, generally rectangular in shape, is used to block off from view, information contained on an insert, such as an identification card, by positioning the opaque coating on the surface of either polymeric sheet such that when the insert is fully inserted on the protective cover, the opaque coating sits directly on top of the information to be blocked. The sheets are either both transparent or one transparent and the other non-transparent. The protective cover can come singly or in a number of bound flippable, overlapping protective covers.

12 Claims, 2 Drawing Sheets

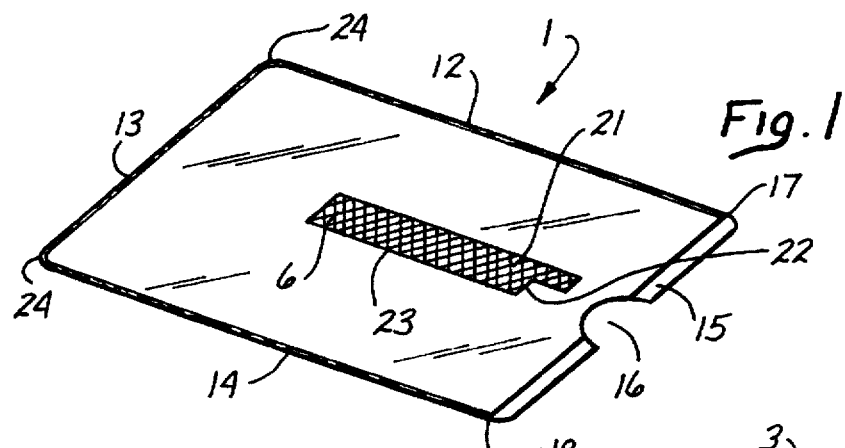
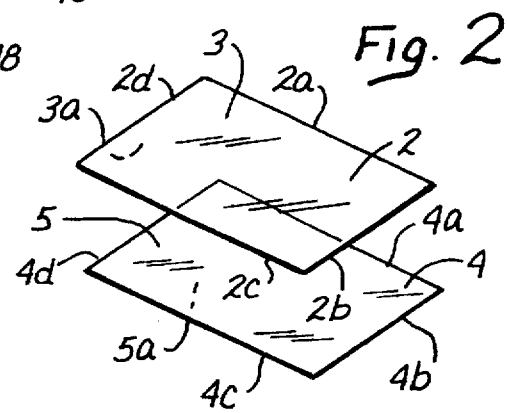
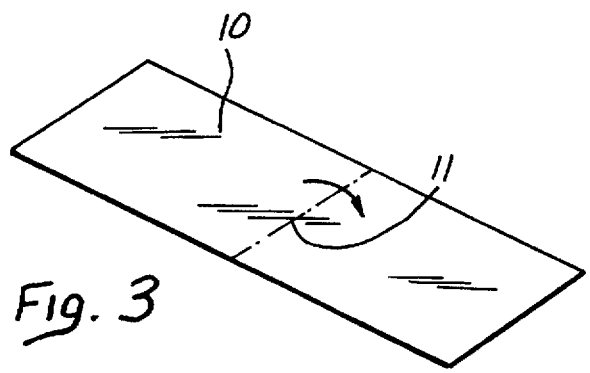
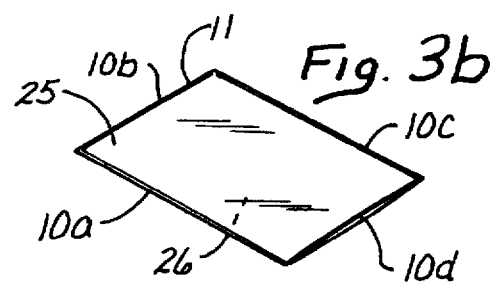
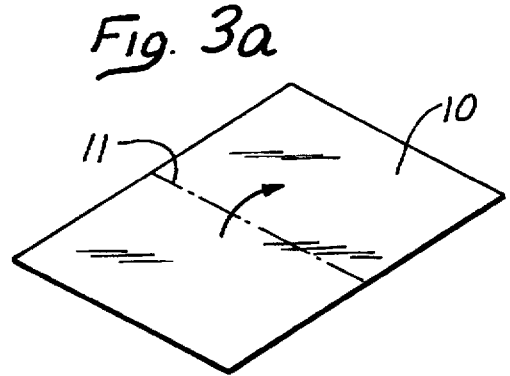
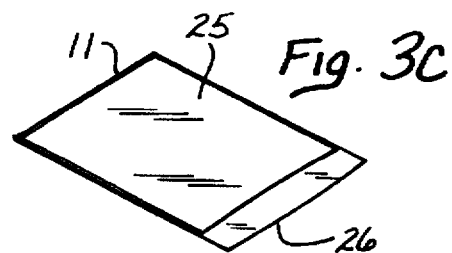

IDENTIFICATION PROTECTIVE COVER

BACKGROUND

It is a common practice to provide a protective cover for identification cards such as driver's license, passport, student identification, patient identification, credit cards and the like, for preservation and protection.

Protective covers are known in the prior art. Those of which the applicant is aware can be categorized as follows:
1. a single transparent or translucent plastic sheet which is folded to receive the insert, after which the folded sheet is laminated to seal the three open sides and laminate the sheets to the opposed faces of the insert;
2. two sheets which are sealed on three sides with a permanently open fourth side so that the insert can be inserted and removed repeatedly;
3. two sheets which are sealed on three sides with a open fourth side so that the insert can be inserted. Then the sheet is laminated to laminate the sheets to the opposed faces of the insert;
4. two sheets which are sealed on three sides with a permanently open fourth side so that the insert can be inserted and removed repeatedly. A number of the protective covers are attached together by the end opposite the open end, and the assembly is used as, for example, in a wallet to hold credit cards, licenses, and the like.

The present invention relates to a protective cover of a flexible conformable polymeric sheets such as plastic, thermoplastic rubber. The cover may comprise of a first and second sheet, at least one of which is transparent. The two sheets are sealed on three sides with a permanently open fourth side to allow repeated insertion and removal of an insert. The insert is a card or object inserted into the protective cover such as a driver's license, professional identification card, student identification card, credit card, insurance identification card and the like. The protective cover is either in the form of a single insertion pocket or a plurality of overlapping insertion pockets usually bound together at one side common to the insertion pockets. The present invention is directed specifically towards a protective cover wherein a completely opaque material, usually in rectangular shape, is permanently printed or applied either on the outside or inside surface, of either the front sheet or the back sheet or on both, to block off selected information contained on the information bearing surface of the card. Completely opaque material (hereinafter referred to as opaque strip) are made of materials such as ultraviolet curable inks, water based inks, solvent based inks, and the like that do not allow light to pass through after the material is permanently applied on the surface such that letters, pictures, or design underneath the opaque strip are completely blocked off from view. The present practice of using adhesive backed paper or adhesive backed plastic strip to cover information does not give permanency. The adhesive backed paper or plastic usually peel off with time.

The purpose of the opaque strips is to allow the user to prevent public disclosure of private information on the insert. For example, blocking information on the residence address may deter, frustrate, and unable an onlooker or bystander to get the address and follow the person or go to the person's place of residence either to solicit or commit a crime at a later time. Consequently, the opaque strip or strips are positioned either on the front or back sheet of the protective cover or both so as to lay directly in front of the information that the user wants to block off from view when the insert is fully inserted inside the protective cover. The exact position and size of the strip or strips depend upon the design of the information bearing surface of the insert. The opaque strip or strips are customized to fit the particular lay out of the information bearing surface of the insert such that the opaque strip sits on top of the information to be blocked when the insert is entirely inside the protective cover. The size of the protective cover is customized to fit the size of the insert, leaving only a slight allowance between the two sheets, to accommodate the insert. The ease of insertion and removal of the insert from the protective cover make it possible for the user to give or the requestor to get the desired information. This allow rapid access to information when required by regulatory agents and governmental authorities. Additionally, to comply with certain code regulations, certain information such as the photograph and the name of the bearer may be selectively freed from blockage so as to reveal those desired information at times.

The opaque strips on the apparatus for storing, displaying and identifying photographs disclosed in U.S. Pat. No. 4,514,919, is used to provide a writing surface for photo identification or notation. Unlike the use of the opaque strip in the present invention, the opaque strip in U.S. Pat. No. 4,514,919 is purposely placed at a position so as not to block the visually transparent viewing portion of the cover showing the picture.

An opaque coating defining one or more generally rectangular windows on the front sheet of a pocket mount is disclosed in U.S. Pat. No. 4,988,556. The opaque coating is used in the invention to prevent light from traveling or leaking around an X-ray film inserted into the pocket. In U.S. Pat. No. 5,364,671, an opaque layer is printed on a frame portion of a cover assembly for photographs. The opaque layer is on either or both of its front and rear surfaces, to serve as a frame border for decorative purposes.

To achieve the same objective of protecting information from readily being accessed to, the protective cover may be alternatively designed with two solid non-transparent flexible polymeric material instead of flexible transparent polymeric material. In the alternate design, instead of opaque strips covering the information, selected spaces on the front or back sheet of the protective cover are cut out to reveal the information that is not protected.

SUMMARY OF THE INVENTION

It is a primary object of the present invention to provide a protective cover with an opaque strip or strips to protect private information contained in the information bearing surface of an insert. Examples of insert are driver's license, professional identification card, student identification card, credit card, insurance identification card and the like.

It is another object of the present invention to provide such protective cover that could be obtained at low cost due to the simplicity of construction.

It is still another object of the present invention to provide a protective cover that not only protects private information from disclosure but also preserve the card, especially the developed magnetic strip on the insert which usually contain encoded information.

It is still another object of the invention to provide a plurality of flippable, overlapping protective covers, attached along one edge, through which a variety of different inserts may be slidably inserted and held.

It is still another object of the invention to provide a protective cover having a non-transparent rear sheet wherein the exposed surface of the rear sheet may be used to provide decorative, informative, or amusing indicia or the like.

To accomplish the foregoing objects and advantages, a single insertion pocket protective cover of the present invention, comprises of two flexible conformable polymeric first and second four-sided sheets which are continuously sealed on three sides,forming a pocket, leaving a permanently opened fourth side to allow repeated insertion and removal of an insert. The first and second sheet form the front and rear side of the protective cover. A single flexible conformable polymeric sheet can also be used by bending the polymeric sheet on a fold line to form a joined front and rear sheet which are bonded on two peripheral edges adjacent to the fold to form the pocket for insertion and removal of the insert. Inserts are typically information bearing cards for identification such as driver's license, professional identification card, student identification card, credit card, insurance identification card and the like. A completely opaque material is permanently applied on the front and rear sheet or only on one sheet of the protective cover. The completely opaque material, preferably rectangular in shape, hereinafter referred to as opaque strip, is positioned on the protective cover so as to lay directly in front of the information or the verification signature on the information bearing surface of the card that is to be blocked off, when the insert is fully inserted inside the protective cover. To prevent displacement of the opaque strip from the information to be blocked, the dimensions of the protective cover is just slightly larger than the insert to allow repeated insertion and removal of the insert but keep the insert from moving inside the protective cover. The polymeric sheets may be both transparent or the first sheet transparent and the second sheet, non-transparent. When a non-transparent sheet is used, advertisements, decorative, informative, or amusing indicia may be printed on the non-transparent exposed surface.

The protective cover is either in the form of a single protective cover or a plurality of flippable, overlapping protective covers bound together along one edge common to all individual insertion pockets. The location of the opaque strips in the individual protective cover, may be in the same position if the inserts are designed identically or the location may vary to fit the particular insert placed inside the protective cover.

BRIEF DESCRIPTION OF THE DRAWINGS

FIG. 1 is a perspective view of the protective cover with opaque strip.

FIG. 2 is an exploded perspective view of two sheets, one on top of the other.

FIG. 3 is a perspective view of a polymeric sheet with a fold line in the middle.

FIG. 3a is a perspective view of a polymeric sheet of a dimensions different from FIG. 3.

FIG. 3b is a perspective view of an alternate construction of the protective cover.

FIG. 3c is a perspective view of an alternate construction of the protective cover with the rear surface longer than the front surface.

DETAILED DESCRIPTION OF THE INVENTION

Figure 4:
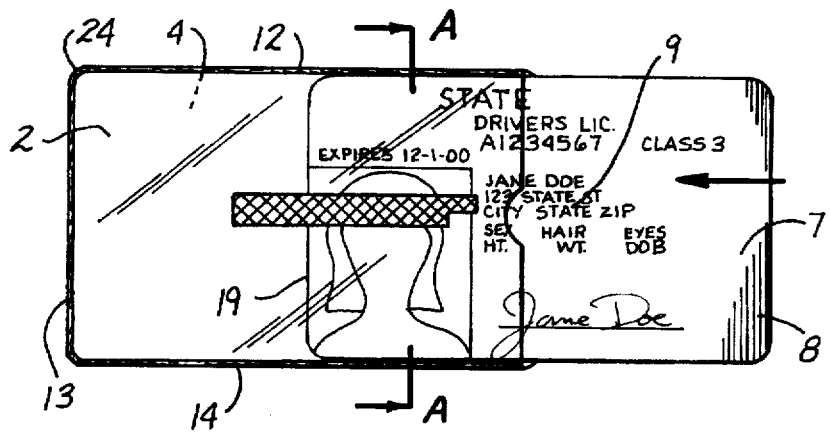
FIG. 4 is a front view showing an insert partially inserted into the protective cover.

A protective cover 1 in accordance with the present invention is illustrated in FIG. 1. The protective cover comprises of a first flexible conformable polymeric sheet 2 having a generally planar top or front surface and a second flexible conformable polymeric sheet 4 having a generally planar bottom or rear surface. Sheets 2 and 4 both have a generally planar upper and lower surfaces, 3 and 3a for sheet 2; 5 and 5a for sheet 4 as shown in FIG. 2. Examples of polymeric material that can be used to fabricate the sheets are binder grade polyvinyl alcohol, polyvinyl acetate, polyvinyl chloride, polypropylene, polysulfone, polyurethane, cellulose acetate, polycarbonate, thermoplastic rubber, polyester. The polymeric sheets 2 and 4 form the front 2 and rear 4 sides of the protective cover 1 which will hereinafter be referred to as front sheet and rear sheet. In the preferred embodiment, the front sheet 2 and the rear sheet 4 each have a generally rectangular configuration and each define four outer peripheral edges, two longitudinal edges 2a and 2c for the front sheet and 4a and 4c for the rear sheet and two lateral edges 2d and 2b for the front sheet and 4d and 4b for the rear sheet. Depending upon the use of the protective cover, the front sheet may be identified or referred to as the top sheet. Likewise, the rear sheet can be referred to as the bottom or back sheet. The nomenclature, top and bottom, is usually used when the second rear sheet 4 lays flat on its lower surface 5a with the first front sheet 2 on top of 4. The peripheral edges for the front or top sheet 2 are labeled 2a, 2b, 2c, and 2d as shown in FIG. 2. The corresponding peripheral edges on the rear or bottom sheet 4 are labeled 4a, 4b, 4c, and 4d. The front and rear sheets are preferably fabricated from plastic. The plastic may be both transparent, or one transparent and one non-transparent. The sheets are of sufficient thickness to provide substantial rigidity to the front and rear sheets. The thickness of the polymeric sheets is typically between 0.006 to 0.02 inches, preferably 0.009 inches.

The front 2 and rear 4 sheets are placed in substantial congruent relation and three sides 12, 13, and 14 are continuously sealed, leaving a fourth side 15 open to form a pocket between the front sheet and the rear sheet for receiving an insert 8 and to allow repeated insertion and removal of an insert as shown in FIG. 4. An insert is a card or an object slidably inserted into the protective cover. Examples of inserts are driver's license, professional identification card, student identification card, credit card, insurance identification card and the like. In a preferred embodiment, the rear sheet 4 includes a side longer than a corresponding side of the front sheet 2 as shown in FIG. 1. Sides 2a, 2d, and 2c of sheet 2 are placed in substantially congruent relation with sides 4a, 4d, and 4c of sheet 4 and these three sides of each sheet continuously sealed and bonded to adhere the front and rear sheets for cohesion, leaving the unmatched, incongruent side for the fourth open side. Alternatively, sides 2d, 2c and 2b of sheet 2 and sides 4d, 4c, and 4b are the three sides continuously sealed, depending upon the orientation of insertion desired. The three sealed sides are labeled 12, 13, and 14 with the open side, 15. Although FIG. 4 shows the opening on the right side, the open end can be any one of the sides. Optionally, for the user's convenience, a semicircular thumb hole 16 is cut, preferably midway between the top side margin 17 and bottom side margin 18 of the open edge 15. The semicircular thumb hole cut catches on both the front 2 and rear 4 sheets as shown in FIG. 1. The front and rear sheets are continuously sealed along the three peripheral edges of sides 12, 13, and 14 by various methods known in the art such as thermal fusion, gluing, radio frequency sealing, ultrasonic sealing and the like.

Figure 7:
FIG. 7 is a plan view of the exposed surface of the rear sheet of the protective cover with printed advertisement.

On a protective cover with a non-transparent rear sheet 2, on the lower exposed surface 5a may be printed decorative, informative, or amusing indicia or the like as shown in FIG. 7.

As shown in FIG. 3 and FIG. 3a, alternately, the protective cover can also comprise of a single flexible conformable polymeric sheet 10, preferably plastic and four-sided, bendable on a fold line 11 to form a joined first and second four-sided sheet for defining front and rear sides of the protective cover, hereinafter referred to as front surface 25 and rear surface 26. The front and rear surfaces are preferably four-sided rectangular in shape and having a generally planar surface with four outer peripheral edges 10a, 10b, 10c, and 10d as shown in FIG. 3b. As in the above protective cover, the front and rear surfaces opposed to each other may be identical in width and length or the rear surface may have a side longer than a corresponding side of the front surface as shown in FIG. 3c. In this alternate design shown in FIG. 3b, the folded edge 10b is inherently close due to the folding and is referred to as the joined folded edge. The edge opposite the joined folded edge 10b is left open and is referred to as edge 10d. The congruent sides 10a and 10c adjacent to the joined folded end 10b is bonded or sealed to form a pocket between the joined front and rear surface for receiving an insert and to allow repeated insertion and removal of the insert. The insert is slidably inserted through the open edge 10d.

Figure 5:
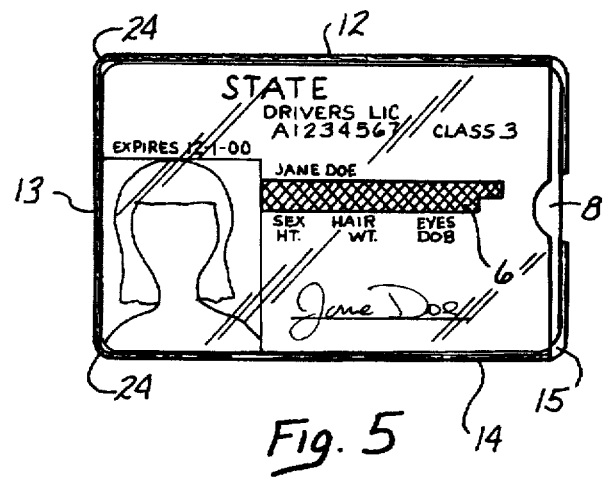
FIG. 5 is a plan view showing a driver's license fully inserted into the protective cover.

A completely opaque material 6 is permanently applied on a surface of the front and rear sheet or only on one sheet of the protective cover. In the alternate design shown in FIGS. 3b and 3c, the opaque material may also be permanently applied on the front and rear surfaces or on only one surface. The completely opaque material 6, preferably rectangular in shape, hereinafter referred to as opaque strip, is positioned on the protective cover so as to lay directly in front of the selected information or verification signature 9 on an information bearing surface 7 of the insert 8 that is to be blocked off, when the insert 8 is fully inserted inside the protective cover as shown by FIGS. 4 and 5. The opaque strip 6 may be applied on the outside surface of the upper surface 3, on the inside surface of the lower surface 3a, on the inside surface of the upper surface 5, or the outside surface of the lower surface 5a. Application of opaque materials on planar surfaces are known in the art. In the preferred embodiment, the opaque material, preferably black in color, is applied by screen printing or hot foil stamping. The composition of ink material suitable for this application is known in the art, an example is a U.V. (ultraviolet) screen printing ink which is cured when exposed to ultraviolet radiation.

Figure 6:
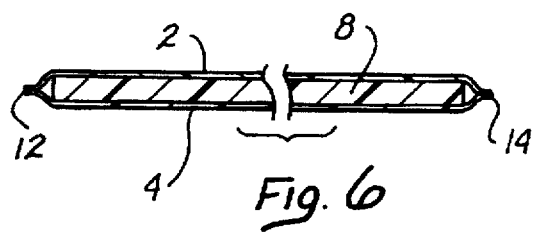
FIG. 6 is an enlarged cross-sectional view of the protective cover shown in FIG. 4 taken along the lines A—A.

The size of the protective cover may correspond to the entire length and width of the insert enabling the protective cover to completely envelope the insert between the front sheet and rear sheet or between the front surface and the rear surface if the alternate design is used. The exact dimensions will vary depending upon the size of the insert that will be introduced into the pocket. For example, for a California Driver's license, the sheets are approximately 3.44 inches in length and 2.25 inches in width prior to the sealing of the three edges. After sealing, the inside dimensions of the resulting pocket are 3.375 inches in length and 2.188 inches in width. These dimensions allow only approximately 0.05 inch (1.3 mm) difference in length between the lateral edge 19 of the license and the lateral edge 13 of the protective cover. This difference in length allow the front and rear sheets to be spaced apart a distance slightly greater than the thickness of the insert slidably inserted therebetween as shown in FIG. 6. When the insert is inside the protective cover, the rear sheet 4 lays flat against the back surface of the insert while the front sheet 2 lays flat against the front surface of the insert, thereby preventing the insert from sliding out of the protective cover.

The exact position and size of the opaque strip 6 on either the front, rear, or both surfaces depend upon the design of the information bearing surface of the insert. The opaque strip 6 is customized to fit the particular layout of the information bearing surface of the insert such that the opaque strip 6 sits directly on top of the desired or selected information on the insert, for example, the address of the bearer, that needs to be blocked off when the insert is entirely inside the protective cover as shown in FIG. 5. For the California Driver's license, using the orientation shown in FIG. 1, the top edge of the opaque strip 6 is positioned approximately 2.4 cm. from the longitudinal edge 12 and the side facing edge 13 is approximately 3.0–3.1 cm. from the lateral edge 13 of the protective cover. There may be more than one opaque strip. The strips may be two rectangular strips directly on top of each other as shown in FIGS. 1 and 5, or spaced apart from each other. The shape may be a regular rectangle or catered to the selected information to be blocked as shown in FIG. 5. For the California driver's license, there are two rectangular strips directly on top of each other. There is the top rectangular strip 21 with a length of approximately 4.5 cm. and the bottom opaque rectangular strip 22 with a length of approximately 4 cm. The width of strip 22 is approximately 4 mm while the width of strip 22 is approximately 3 mm. The bottom edge 23 of the bottom opaque strip 22 is approximately 2.6 cm. from the longitudinal edge 14 of the protective cover. If desired, the corners 24 of the protective cover 1 are rounded to conform for example, with the rounded edge of the California driver's license.

Figure 8:
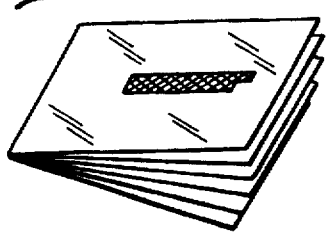
FIG. 8 is a perspective view of a plurality of protective covers bound on one common edge.

The protective cover described above is for a single protective cover. A plurality of single protective covers catering to different types of insert may also be bound together along one edge common to all the individual units of single protective cover, either on 12, 13, or 14, as shown in FIG. 8. Other means for assembling the single protective cover into a plurality of protective covers to enable providing for multiple sets of protective covers are known and disclosed, for example, in U.S. Pat. Nos. 5,323,552, 3,446, 260, 3,829,995 and 4,514,919, which are incorporated herein by this reference.

Changes may be made in the above product without departing from the scope of the invention herein. It is intended that all matter contained in the above description or shown in the accompanying drawing shall be interpreted as illustrative and not in a limiting sense.

What is claimed is:

1. An insert identification protective cover in a range of sizes, comprising:

a first flexible conformable polymeric sheet forming a front sheet having a generally planar surface, the front sheet comprising outer peripheral edges;

a second flexible conformable polymeric sheet forming a rear sheet having a generally planar surface, the rear sheet comprising outer peripheral edges, the outer peripheral edges of the rear sheet continuously bonded to the outer peripheral edges of the front sheet, leaving an edge open to form a pocket between the front sheet and rear sheet for receiving an insert; and an opaque material permanently applied on a planar surface of the protective cover, the opaque material defining a specific shape, positioned on the planar surface so as to block off from view selected information printed on the insert to prevent public disclosure of information on the insert.

2. The protective cover of claim 1, wherein the flexible polymeric sheet is rectangular in shape with two outer longitudinal peripheral edges and two outer lateral edges.

3. The protective cover of claim 1, wherein the sheets are made of plastic.

4. The protective cover of claim 1, wherein one sheet is transparent.

5. The protective cover of claim 1, wherein the front and rear sheets are transparent.

6. The protective cover of claim 1, wherein the front sheet and the rear sheet are of the same length and width.

7. The protective cover of claim 1, wherein the rear sheet includes a side longer than a corresponding side of the front sheet.

8. The protective cover of claim 1, wherein a semicircular thumb hole is cut midway between the length of the open edge.

9. The protective cover of claim 1, further comprising a means for attaching single identification protective covers to form a plurality of bound protective covers.

10. An insert identification protective cover in a range of sizes, comprising:

a single four-sided flexible conformable polymeric sheet folded to define a joined generally planar front surface and generally planar rear surface, the joined front and rear surface comprising a joined folded edge, three outer peripheral edges, one outer peripheral edge opposite the joined folded edge kept open, two outer peripheral edges adjacent to the joined folded edge continuously bonded to form a pocket for receiving an insert between the joined front surface and rear surface; and an opaque material permanently applied on a planar surface of the protective cover, the opaque material defining a specific shape, positioned on the planar surface so as to block off from view selected information printed on the insert to prevent public disclosure of information on the insert.

11. An opaque material permanently applied on a planar surface of a protective cover, the opaque material defining a specific shape and positioned on the planar surface to block off from view information printed on an object slidably inserted into the protective cover to prevent public disclosure of information on the insert.

12. A method for preventing public disclosure of information printed on an insert, comprising the steps of:

fabricating a protective cover made of a first and a second flexible conformable polymeric sheets having four outer peripheral edges continuously bonded on three sides, leaving an open edge to form a pocket for receiving an insert, the protective cover having an opaque material permanently applied on a surface of the polymeric sheet, the opaque material positioned on the surface so as to block off selected information from view;

sliding an information bearing insert into the open edge; and, covering a selected information on the information bearing insert with the opaque material positioned directly in front of the selected information.

* * * * *